United States Patent
Rossi et al.

(10) Patent No.: US 8,583,288 B1
(45) Date of Patent: Nov. 12, 2013

(54) SYSTEM AND METHOD FOR USING CLIMATE CONTROLLED SPACES AS ENERGY STORAGE UNITS FOR "RECEIVING" SURPLUS ENERGY AND FOR "SUPPLYING" ENERGY WHEN NEEDED

(75) Inventors: John Rossi, Norcross, GA (US); Wendell Miyaji, Norcross, GA (US)

(73) Assignee: Comverge, Inc., Norcross, GA (US)

( * ) Notice: Subject to any disclaimer, the term of this patent is extended or adjusted under 35 U.S.C. 154(b) by 229 days.

(21) Appl. No.: 13/118,414

(22) Filed: May 28, 2011

Related U.S. Application Data

(60) Provisional application No. 61/349,792, filed on May 28, 2010.

(51) Int. Cl.
*G05B 15/00* (2006.01)
*G05B 13/00* (2006.01)
*G05B 21/00* (2006.01)
*G01M 1/38* (2006.01)
*G05D 23/00* (2006.01)

(52) U.S. Cl.
USPC ............................................. 700/277; 700/276

(58) Field of Classification Search
USPC .................................................. 700/277, 276
See application file for complete search history.

(56) References Cited

U.S. PATENT DOCUMENTS

| | | | |
|---|---|---|---|
| 6,037,758 A | 3/2000 | Perez | |
| 6,542,791 B1 | 4/2003 | Perez | |
| 6,889,122 B2 | 5/2005 | Perez | |
| 7,130,719 B2 | 10/2006 | Ehlers et al. | |
| 7,343,226 B2* | 3/2008 | Ehlers et al. | 700/276 |
| 8,326,466 B2* | 12/2012 | Peterson | 700/276 |
| 8,369,998 B2* | 2/2013 | Drake et al. | 700/295 |
| 8,374,729 B2* | 2/2013 | Chapel et al. | 700/295 |
| 2004/0133314 A1* | 7/2004 | Ehlers et al. | 700/276 |
| 2007/0043478 A1* | 2/2007 | Ehlers et al. | 700/276 |
| 2009/0062969 A1 | 3/2009 | Chandra et al. | |
| 2009/0088991 A1 | 4/2009 | Brzezowski et al. | |
| 2009/0292402 A1 | 11/2009 | Cruickshank, III | |
| 2010/0088261 A1 | 4/2010 | Montalvo | |
| 2011/0046806 A1* | 2/2011 | Nagel et al. | 700/291 |

* cited by examiner

*Primary Examiner* — Mohammad Ali
*Assistant Examiner* — Ziaul Karim
(74) *Attorney, Agent, or Firm* — Smith Risley; Steven P. Wigmore

(57) ABSTRACT

A method and system for managing an energy supply of a utility provider include calibrating one or more climate controlled spaces for a controller. The calibrating may include calculating a heating/cooling ratio for the one or more climate controlled spaces. After this calibration occurs, the system may determine if an energy supply surplus exists. If an energy supply surplus exists, then the system may start using the one or more climate controlled spaces as energy sinks for expending energy according to the heating/cooling ratio. The system may also determine if an energy supply deficit exists and if an energy supply deficit exists, then the system may start using the one or more climate controlled spaces as energy "sources," in which a direct load control algorithm is used to reduce energy consumption by the one or more climate controlled spaces.

20 Claims, 8 Drawing Sheets

H/C Ratio = (t0 + t1)/t2

SYSTEM AND METHOD FOR USING CLIMATE CONTROLLED SPACES AS ENERGY STORAGE UNITS FOR "RECEIVING" SURPLUS ENERGY AND FOR "SUPPLYING" ENERGY WHEN NEEDED

PRIORITY AND RELATED APPLICATIONS STATEMENT

This application claims priority under 35 U.S.C. §119(e) to provisional patent application Ser. No. 61/349,792 filed on May 28, 2010, entitled, "Variable Demand Resource to Balance Fluctuating Supply in an Electric Supply and Distribution System," the entire contents of which are hereby incorporated by reference.

BACKGROUND

Utility providers face the problem of satisfying consumer demand for electrical energy during peak and off-peak demand periods. Total electrical energy demand may vary significantly between the peak and off-peak demand periods. For example, energy demand typically peaks on a hot summer afternoon as a result of the widespread simultaneous operation of air conditioning systems. And energy demand may subsequently drop during the off-peak period of the late evening.

To accommodate very high peak demands, utility providers face options of investing in additional power generating capacity, buying power from other utilities having excess capacity, or using an electrical load management system to control the amount of electrical energy distributed over the electrical distribution network during peak energy demand periods by electrical load reductions. Such load reductions are commonly referred to in the industry as load shedding. Load shedding is usually the more cost effective alternative to investing in expensive additional power generating capacity. Devices that are used to produce additional power generating capacity are often referred to in the industry as "peakers."

As of this writing, many utility providers have turned to load shedding as the most viable option to address very high peak demands instead of purchasing peakers. Load shedding usually comprises "direct load control" or demand response programs. Direct load control is a method where utility providers may interrupt the loads of their consumers during critical energy demand times.

In exchange for permitting this interruption during a direct load control event, the consumer generally receives direct payments from the utility provider. As one example of load shedding, a homeowner on a direct load control program may find his air conditioner periodically interrupted on hot summer days by a switch operated remotely by the utility provider. In exchange for permitting this remote operation of the switch, the homeowner usually receives a payment from the utility provider.

This load cycling by the utility provider for a load control program may reduce overall energy consumption when electricity demand is highest, thereby improving grid reliability and reducing energy costs for the utility provider. In addition to load shedding for addressing peak energy demands, utility providers have been increasing the use of alternate energy sources, such as solar power from photovoltaic cells and solar power for steam-generation. Other alternate energy sources include wind energy from windmill powered turbines as well as traditional alternate energy sources like hydroelectric energy from dams.

Because alternate energy sources like solar power and wind power may produce energy surplus on occasions due to their unpredictability, utility providers need ways to expend this additional energy efficiently and without risking a disruption in energy service by shutting down critical energy sources. For example, suppose that a utility provider has a solar power source, a wind power source, and a nuclear power source. When either the solar power source or wind power source generate a surplus amount of energy, the utility provider will likely not want to shut down or lower the production of the nuclear power source to offset this surplus in energy being produced by the solar power source or wind power source or both. The utility provider will not want to shut down or reduce energy production at the nuclear power plant in order to be ready for when a demand in energy may peak suddenly.

Accordingly, what is needed is a system and method that may overcome the problems associated with the excess energy production from alternate energy sources like solar power and wind power, especially when the excess energy is not needed immediately in an energy distribution system. Another need exists in the art for system that can overcome both the problems associated with excess energy production as well as the problems associated with peak demands for energy when extra energy is needed in an energy distribution system.

SUMMARY OF THE DISCLOSURE

A method and system for using climate controlled spaces as energy storage units for receiving surplus energy and for supplying energy during load shed events are described. The method and system include calibrating one or more climate controlled spaces for a controller. The calibrating may include calculating a heating/cooling ratio for the one or more climate controlled spaces. After this calibration occurs, the system may determine if an energy supply surplus exists. If an energy supply surplus exists, then the system may start using the one or more climate controlled spaces as energy sinks for expending energy according to the heating/cooling ratio. The system may also determine if an energy supply deficit exists and if an energy supply deficit exists, then the system may start using the one or more climate controlled spaces as energy "sources," in which a direct load control algorithm is used to reduce energy consumption by the one or more climate controlled spaces.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

Figure 1A:
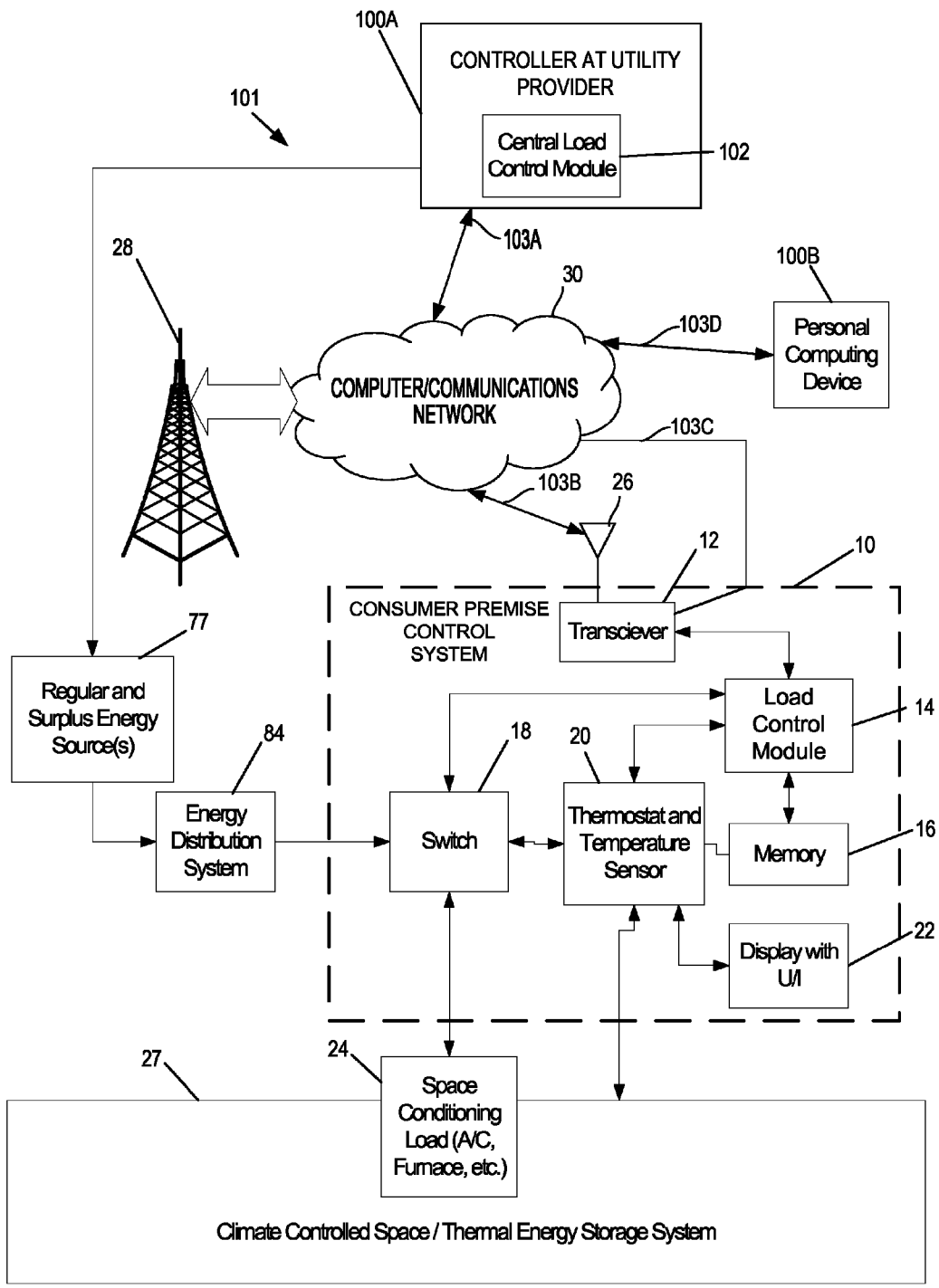
FIG. 1A is a diagram of a system for using climate controlled spaces as energy storage units for "receiving" surplus energy and for "supplying" energy during load shed events.

Referring initially to FIG. 1A, this figure is a diagram of a system 101 for using climate controlled spaces 27 as energy storage units for "receiving" surplus energy and for "supplying" energy during load shed events. The system 101 may include a customer premise control system 10, a space conditioning load 24, a climate controlled space that comprises a climate controlled space 27, a wireless communications tower 28, a communications network 30, a controller 100A at a utility provider, and a personal computing device 100B.

Exemplary wireless communication networks that may employ wireless communications towers 28 or wireless environments in general include, but are not limited to, Advanced Metering Infrastructure (AMI) networks, Home Area Networks (HANs), any combination of the above, and other similar wireless communication networks. Many of the system elements illustrated in FIG. 1A are coupled via communications links 103A-D to the communications network 30.

The links 103 illustrated in FIG. 1A may comprise wired or wireless communication links. Wireless communication links include, but are not limited to, radio-frequency ("RF") links, infrared links, acoustic links, and other wireless mediums. The communications network 30 may comprise a wide area network ("WAN"), a local area network ("LAN"), the Internet, a Public Switched Telephony Network ("PSTN"), a power lines communication ("PLC") network, a paging network, or a combination thereof. The communications network 30 may be established by broadcast RF transceiver towers 28. However, one of ordinary skill in the art recognizes that other types of communication devices besides broadcast RF transceiver towers 28 are included within the scope of the system 101 for establishing the communications network 30.

The controller 100A at the utility provider may comprise a computer server that includes a central load control module 102. The central load control module 102 may comprise software or hardware (or both) as understood by one of ordinary skill in the art. The central load control module 102 may issue commands that include load control parameters which are sent over the communications network 30 to the customer premise control system 10. Such load control parameters may include, but are not limited to, the total duration of a utility cycling control event and a duty cycle that defines the ratio of power removed from the space conditioning load 24 and power provided to the conditioning load 24 over a predefined period.

The central load control module 102 may calibrate a select number of climate controlled spaces 27 to use as energy storage units as will be described in further detail below. The central load control module 102 may determine if an energy surplus is currently available and if an energy surplus is available, then the load control module 102 may use a number of climate controlled spaces 27 as energy "sinks" to receive the surplus energy. Meanwhile, if an energy demand exists, then the load control module 102 may use a number of climate controlled spaces 27 as indirect energy "suppliers" by using a direct load control algorithm as described above for reducing energy demand. In this way, because the climate controlled space(s) 27 may be used both as a "sink" and a "supply" for energy, the climate controlled space(s) 27 may be characterized as a rechargeable "thermal battery."

The central load control module 102 may transmit its commands over the communications network 30 as load control parameters. These exemplary load control parameters as well as the main operation of the low control module 102 will be discussed in further detail below in connection with FIG. 4.

The central controller 100A of the utility provider is also coupled to one or more regular and surplus energy sources 77. The one or more regular and surplus energy sources 77 may include, but are not limited to, nuclear power, wind power, solar power, geothermal power, hydroelectric power, and fossil fuelled power plants such as, but not limited to, coal-fired power stations, renewable energy plants or biomass-fuelled power plants, combined cycle plants, internal combustion reciprocating engine power plants, etc.

An energy distribution system 84 may be coupled to the regular and surplus energy sources 77 and the switch 18. The energy distribution system 84 may comprise components for distributing and managing electrical energy. In such an exemplary embodiment, the energy distribution system 84 may comprise a network that carries electricity from a transmission system and delivers it to consumers. Typically, the network would include medium-voltage (less than 50 kV) power lines, electrical substations and pole-mounted transformers, low-voltage (less than 1 kV) distribution wiring and sometimes electricity meters.

The personal computing device 100B which is coupled to the communication is network 30 may comprise a general purpose computer that may be operated by a utility provider to issue commands directly to the customer premise control system 10. Alternatively, the personal computing device 100B may be operated by a utility provider for issuing commands to the central controller 100A at the utility provider. In this description, the personal computing device 100B may include a cellular telephone, a pager, a portable digital assistant ("PDA"), a smartphone, a navigation device, a hand-held computer with a wireless connection or link, a lap-top, a desk top, or any other similar computing device.

The customer premise control system 10 may comprise a transceiver 12, an antenna 26, a load control module 14, a switch 18, a thermostat and temperature sensor 20, memory 16, and a display with a user interface 22. The transceiver 12 may comprise a communication unit such as a modem, a network card, or any other type of coder/decoder (CODEC) for receiving and sending load control signals to and from the communications network 30. In a wireless embodiment, the transceiver 12 may further comprise a radiofrequency circuit for generating radiofrequency communication signals which utilize the antenna 26 and that establish the wireless communications link 103B with the communication network 30. In other embodiments, the transceiver 12 may be coupled to the communications network 30 by a direct wired communications link 103C.

While the elements of the customer premise control system 10 have been illustrated as contained within a single rectangular dashed box, one of ordinary skill in the art recognizes that any of these elements for the customer premise control system 10 may employ various different electronic packaging schemes without departing from the scope of the system 10. That is, for example, the transceiver 12 may reside in a different physical housing relative to the load control module 14.

Similarly, the load control module 14 may reside in a housing which is separate relative to the housing for the thermostat and temperature sensor 20. And lastly, all of the elements of the customer premise control system 10 may reside within a single housing without departing from the scope of the system 10.

The load control module 14 may comprise hardware or software or a combination thereof. The hardware may comprise a microprocessor running various types of software. The hardware may include electronics, such as application specific integrated circuits (ASICs) and the like. The load control module 14 receives and processes signals from the transceiver 12 in order to control the switch 18 which supplies power to the space conditioning load 24.

The load control module 14 and switch 18 may form a unit that is made similarly to the switch described in U.S. Pat. No. 5,462,225 issued in the name of Massara et al., the entire contents of which are hereby incorporated by reference. The switch 18 is designed to control power supplied to the space conditioning load 24.

The load control module 14 may comprise several timers: one for tracking load shed time; one for tracking load restore time; and one for tracking the length of a utility cycling control event, as will be described below.

A temperature delta value may be established relative to a current room temperature or relative to a temperature set point of the thermostat 20. One of ordinary skill the art recognizes that a temperature delta value relative to a current or absolute room temperature may be different compared to a set point of the thermostat 20. That is, one of ordinary skill in the art recognizes that a temperature set point of a thermostat 20 does not always reflect the current room temperature of a climate controlled space 26.

The transceiver 12 is coupled to the load control module 14. The transceiver 12 may relay the load control parameters 34 from the controller 32 at the utility provider to the load control module 14. The load control module 14 may also transmit messages with the transceiver 12 to the controller 32 at the utility provider as well as to the personal computing device 100B via the communications network 30.

The transceiver 12 and load control module 14 may be part of the device known as a digital control unit (DCU) manufactured by Comverge, Inc. A DCU may be designed to be coupled outside of a dwelling near one or more parts of an HVAC system, such as near the compressor of an air-conditioning unit. The DCU may be used for communication through various channels including through wide area and local area networks 30. Another example of the load control module 14 is a computational device like a computer or dedicated processing unit that is coupled to the space conditioning load 24.

The load control module 14 may be coupled to memory 16. The memory 16 may comprise a volatile component or a non-volatile component, or a combination thereof. The non-volatile component may comprise read only memory (ROM). The ROM may store the operating system (OS) for the load control module 14 which may be executed by a central processing unit and/or firmware of the load control module 14 as understood by one of ordinary skill in the art.

The volatile component for the memory 16 of the customer premise control system 10 may comprise random access memory (RAM). The volatile memory component for the premise control system 10 may incorporate other different memory technologies, such as, but not limited to, erasable programmable read-only memory (EPROM) or electrically erasable programmable read-only memory (EEPROM), and/or flash memory and ferroelectric random access memory (FRAM).

Figure 4:
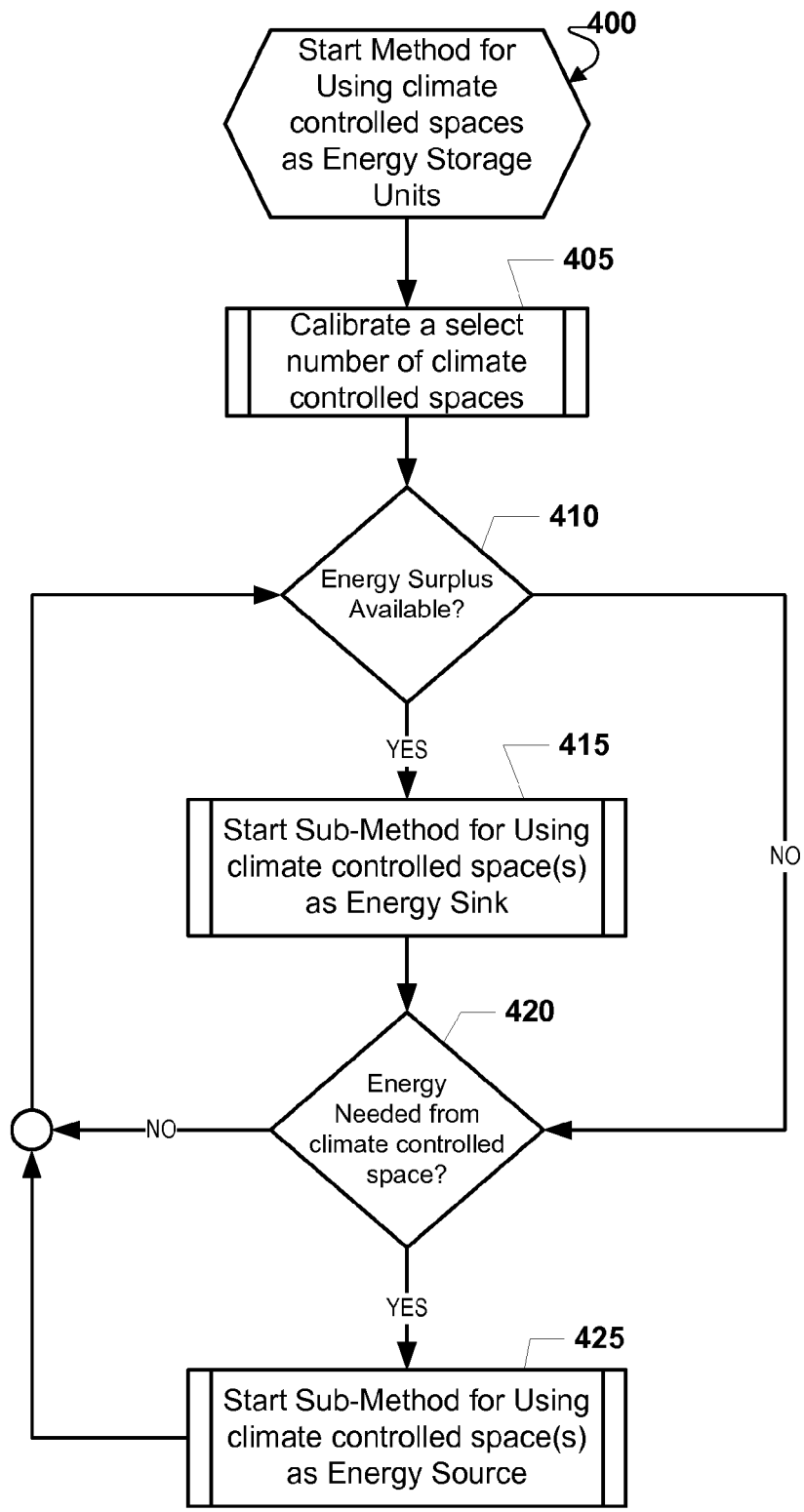
FIG. 4 is a flowchart illustrating a method for using one or more climate controlled spaces as energy storage units.

The memory 16 may store the instructions corresponding to the method illustrated in FIG. 4. The memory 16 may also record events detected by the load control module 14 such as, but not limited to, actions taken by load control module 14, data generated by the thermostat 20, such as times between "on" and "off" cycles of a compressor or HVAC unit, load control parameters transmitted by the controller 100A at the utility provider, and commands issued by the personal computing device 100B coupled to the communications network 30.

The load control module 14 is also coupled to the thermostat 20. The thermostat 20 may comprise a programmable or intelligent thermostat that is usually positioned inside the climate controlled space 27. Exemplary programmable or intelligent thermostats known as of this writing include those manufactured by White Rogers or Honeywell. The temperature sensor may be implemented as a temperature measurement component, such as a thermistor, which senses space temperatures and outputs temperature signals representing measured space temperatures within the climate controlled space 27. It is noted that the climate controlled space 27 may also comprise a single room of a climate controlled space or a plurality of rooms forming a "zone" in the climate controlled space 27 as understood by one of ordinary skill in the art.

The thermostat and temperature sensor 20 may comprise a display having a user interface 22. Such a display having a user interface 22 may comprise a touch screen display such as a touch screen display generated by a liquid crystal display (LCD) or a light emitting diode (LED) display. Instead of a touch screen display, the display may not support touch commands but may instead work with a separate physical user interface such as a keypad, keyboard, and designated function buttons as understood by one of ordinary skill in the art.

The space conditioning load 24 is coupled to the switch 18 which is in turn coupled to the load control module 14. The space conditioning load 24 may comprise a heating, ventilating, air-conditioning (HVAC) system as understood by one of ordinary skill in the art. If the space conditioning load 24 is an air-conditioning system, the switch 18 restores distribution of electrical power to the compressor of the space conditioning load 24. Alternatively, if the space conditioning load 24 is a forced air heating system or a heat pump, the switch 18 restores electrical power to either the fan of a furnace or the compressor of a heat pump. The switch 18 may be controlled by the thermostat 20 and the load control module 14.

The climate controlled space 27 may comprise any type of room or volume which is fully closed off or partially closed off relative to the outside. As noted above, the climate controlled space 27 may comprise a single room or a plurality of rooms joined together by an air ventilation system.

Figure 1B:
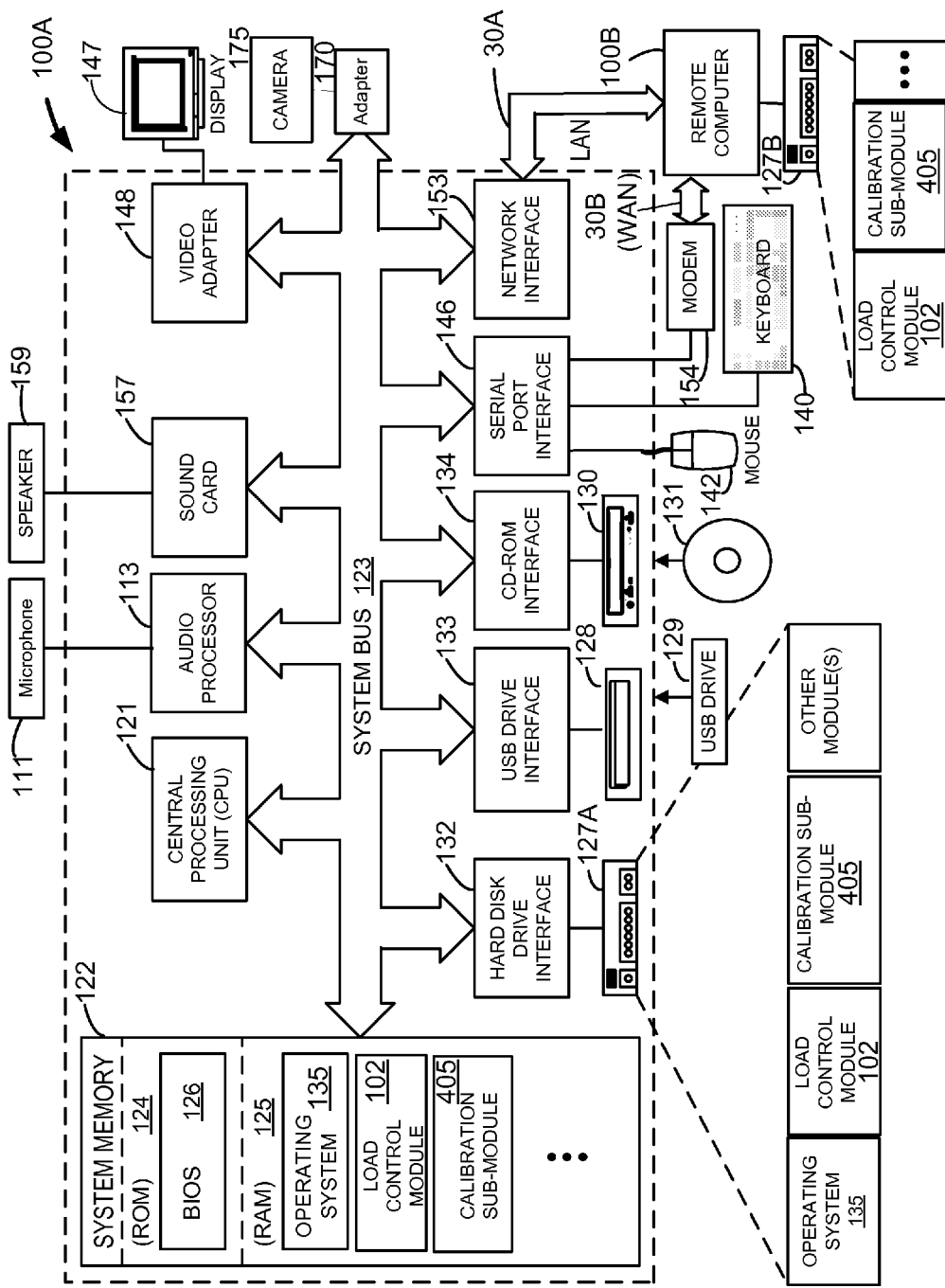
FIG. 1B is diagram of a central controller for a utility provider as illustrated in FIG. 1A.

FIG. 1B is a diagram of the main components for an exemplary central controller 100A at a utility provider illustrated in FIG. 1A. The exemplary operating environment for the central controller 100A includes a general-purpose computing device in the form of a conventional computer.

Generally, the computer forming the central controller 100A includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory ("ROM") 124 and a random access memory ("RAM") 125. A basic input/output system ("BIOS") 126, containing the basic routines that help to transfer information between elements within computer, such as during start-up, is stored in ROM 124.

The computer 100A may include a hard disk drive 127A for reading from and writing to a hard disk, not shown, a USB port 128 for reading from or writing to a removable USB drive 129, and an optical disk drive 130 for reading from or writing to a removable optical disk 131 such as a CD-ROM, a DVD, or other optical media. Hard disk drive 127A, USB drive 129, and optical disk drive 130 are connected to system bus 123 by a hard disk drive interface 132, a USB drive interface 133, and an optical disk drive interface 134, respectively.

Although the exemplary environment described herein employs hard disk 127A, removable USB drive 129, and removable optical disk 131, it should be appreciated by one of ordinary skill in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the system 101. Such uses of other forms of computer readable media besides the hardware illustrated will be used in internet connected devices.

The drives and their associated computer readable media illustrated in FIG. 1B provide nonvolatile storage of computer-executable instructions, data structures, program modules, and other data for computer or client device 100A. A number of program modules may be stored on hard disk 127, USB drive 129, optical disk 131, ROM 124, or RAM 125, including, but not limited to, an operating system 135, the load control module 102, and a calibration module 405. Details about the load control module 102 will be described below in connection with FIG. 4 while details about the calibration module 405 will be described below in connection with FIG. 5. Each program module include routines, subroutines, programs, objects, components, data structures, etc., which perform particular tasks or implement particular abstract data types.

A user may enter commands and information into the computer through input devices, such as a keyboard 140 and a pointing device 142. Pointing devices may include a mouse, a trackball, and an electronic pen that can be used in conjunction with an electronic tablet. Other input devices (not shown) may include a joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 may comprise a video camera. The camera 175 can be a CCD (charge-coupled device) camera or a CMOS (complementary metal-oxide-semiconductor) camera. In addition to the monitor 147 and camera 175, the client device 100A, comprising a computer, may include other peripheral output devices (not shown), such as a printer.

The computer may also include a microphone 111 that is coupled to the system bus 123 via an audio processor 113 is understood by one of ordinary skill in the art. A microphone 111 may be used in combination with a voice recognition module (not illustrated) in order to process audible commands received from an operator. A speaker 159 may be provided which is coupled to a soundcard 157. The soundcard 157 may be coupled to the system bus 123.

The computer forming the central controller 100A may operate in a networked environment using logical connections to one or more remote computers, such as a web server. A remote computer 100B may be another personal computer, a server, a mobile phone, a router, a networked PC, a peer device, or other common network node. While the web server or a remote computer 100B typically includes many or all of the elements described above relative to central controller 100A, only a memory storage device 127B has been illustrated in this FIG. 1B. The logical connections depicted in FIG. 1B include a local area network (LAN) 30A and a wide area network (WAN) 30B. Such networking environments are commonplace in offices, enterprise-wide computer networks, intranets, and the Internet.

When used in a LAN networking environment, the computer forming the central controller 100A is often connected to the local area network 30A through a network interface or adapter 153. When used in a WAN networking environment, the computer typically includes a modem 154 or other means for establishing communications over WAN 30B, such as the Internet. Modem 154, which may be internal or external, is connected to system bus 123 via serial port interface 146. In a networked environment, program modules depicted relative to the server 100B, or portions thereof, may be stored in the remote memory storage device 127A. It will be appreciated that the network connections shown are exemplary and other means of establishing a communications link between the computers may be used.

Moreover, those skilled in the art will appreciate that the system 101 may be implemented in other computer system configurations, including hand-held devices, multiprocessor systems, microprocessor based or programmable consumer electronics, network personal computers, minicomputers, mainframe computers, and the like. The system 101 may also be practiced in distributed computing environments, where tasks are performed by remote processing devices that are linked through a communications network. In a distributed computing environment, program modules may be located in both local and remote memory storage devices.

Figure 2:
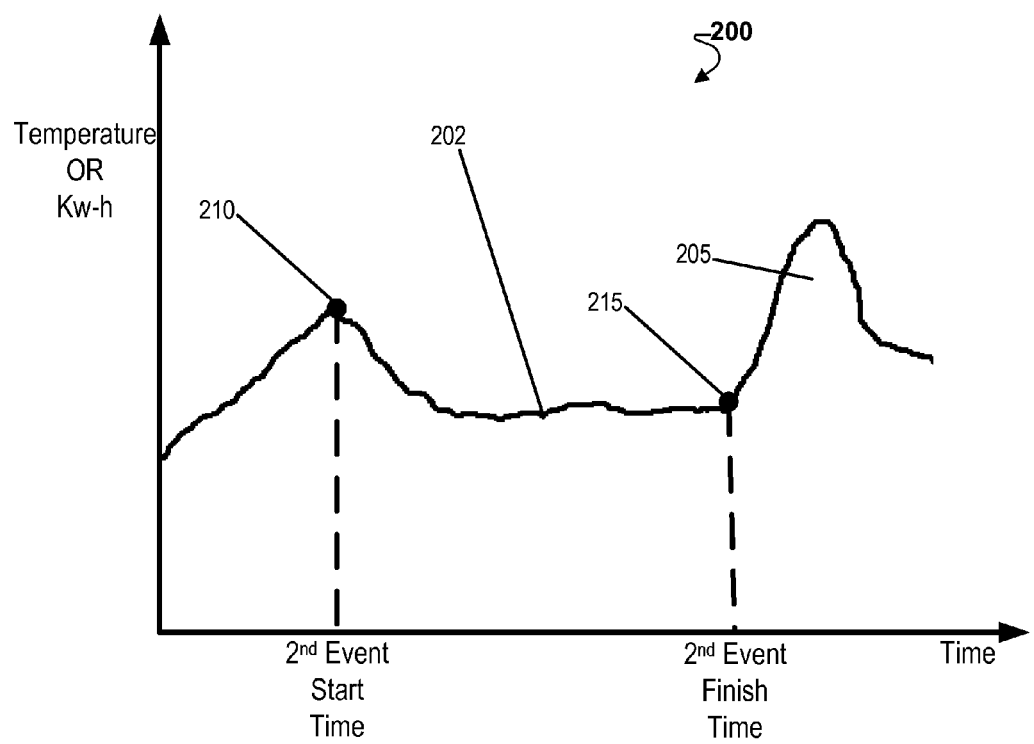
FIG. 2 is a graph that includes a plot of thermal energy in equivalent Kilowatt hours of the climate controlled space of FIG. 1A versus time.

FIG. 2 is a graph 200 that includes a plot of temperature (in degrees Fahrenheit) and/or Kilowatt hours (Kw-h) that may be needed to change the temperature of the climate controlled space 27 of FIG. 1A by some amount (Y-AXIS) versus time (X-AXIS). The graph 200 comprises a curve 202 that tracks any surplus or deficit thermal energy in the climate controlled space 27 during a summer or tropical climate in which the outside ambient temperature greatly exceeds the indoor temperature of the climate controlled space 27. As noted above, the climate controlled space 27 may include a single room, a plurality of rooms, or a building, as illustrated in FIG. 1A.

A first control event may correspond between time zero (at the origin) to point 210. This first control event may include a direct control event in which the space conditioning load 24, such as an air-conditioner, is cycled off During this first control event, the temperature within the climate controlled space 27 (and energy in Kw-h needed to cool the space 27) usually increases in the absence of the space conditioning load 24 running, such as an air conditioning unit.

A second control event (i.e. an air-conditioning event) start time which corresponds to point 210 on the curve 202 and the activation of an air-conditioning unit in an exemplary summer season or tropical climate scenario, the temperature (and energy in Kw-h needed to cool the space) generally decreases and is held level at the set point temperature on the thermostat 20 is reached.

Curve 202 of graph 200 may generally correspond with a temperature inside the climate controlled space 27 measured with the thermostat 20. The thermostat 20 may have thermal sensors for detecting the temperature within the climate controlled space or room 27 as illustrated in FIG. 1A.

After the second control event (i.e. an air-conditioning event) finish time which generally corresponds to point 215 on curve 202 and the "turning-off" of an air-conditioning unit for the climate controlled space 27 in an exemplary summer or tropical climate scenario, the temperature may increase within the climate controlled space 27 which corresponds to an increase in Kilowatt-hours needed to cool the climate control space 27.

This increased temperature corresponding to the increase in energy is denoted as region 205 in graph 200. This region 205 in graph 200 will become the energy "source" for when the climate controlled space 27 is to be used for expending excess or surplus energy produced by the regular and/or surplus energy sources 77. As understood by one of ordinary skill in the art, the thermal profile illustrated with graph 200 would be different for a winter or arctic climate heating scenario in which thermal energy within the climate controlled space 27 would rapidly decrease after each control event. Each control event in a winter or arctic climate heating scenario would generally comprise activation of a forced air heating system and/or electric heat pump. In such a winter or arctic climate heating scenario, the reduction of thermal energy within the climate controlled space 27 would be used as the energy "source" for when the climate controlled space is to be used for expending excess or surplus energy produced by the regular and/or surplus energy sources 77.

Referring back to the exemplary summer season or tropical climate cooling scenario illustrated in FIG. 2, if the curve 202 represents temperature within the climate controlled space 27 of FIG. 1A, then the slope of the temperature rise is a function of the thermal characteristics of the climate controlled space 27 which may include, but are not limited to, at least the following factors: the amount of insulation used within the walls forming the climate controlled space 27, and the number and placement of windows, especially those windows facing the sun. It is also noted at the end of the control event corresponding to point 215 on curve 202, the space conditioning load 24 will work to overcome the energy deficit 205 while the space conditioning load 24 has been in an off state.

One key parameter that may be important to the system 101 is the slope at which the temperature of the climate controlled space 27 returns to the set point established with the thermostat 20. The slope of the curve 202 after the control event start time corresponding to point 210 is generally a function of the size of the space conditioning load 24 in the thermal characteristics of the climate controlled space 27.

The information required to compute the approximate magnitude and approximate duration of an energy deficit resource corresponding to region 205 of curve 202 is generally determined using the following three factors: 1) the thermostat set point; 2) the slope of the climate controlled space curve 202 when the space conditioning load 24 is shut off; and 3) the slope of the cooling curve (corresponding to the region after the event start time point 210 of curve 202) when the space conditioning load attempts to restore the temperature of the climate controlled space 27 to the set point established with the thermostat 20.

These three factors are generally available from the thermostat 20 and hence an accurate estimate of the energy deficit magnitude and the duration that the deficit 205 of graph 200 can be computed using data tracked with the thermostat 20. The data tracked with the thermostat 20 may be relayed to the central controller 100A at the utility provider over the communications network 30. Such relaying of data may be supported by any Advanced Metering Infrastructure (AMI) networks, or other networks, such as, but not limited to, the Internet, direct RF/Paging communications, etc., as understood by one of ordinary skill in the art.

Figure 3:
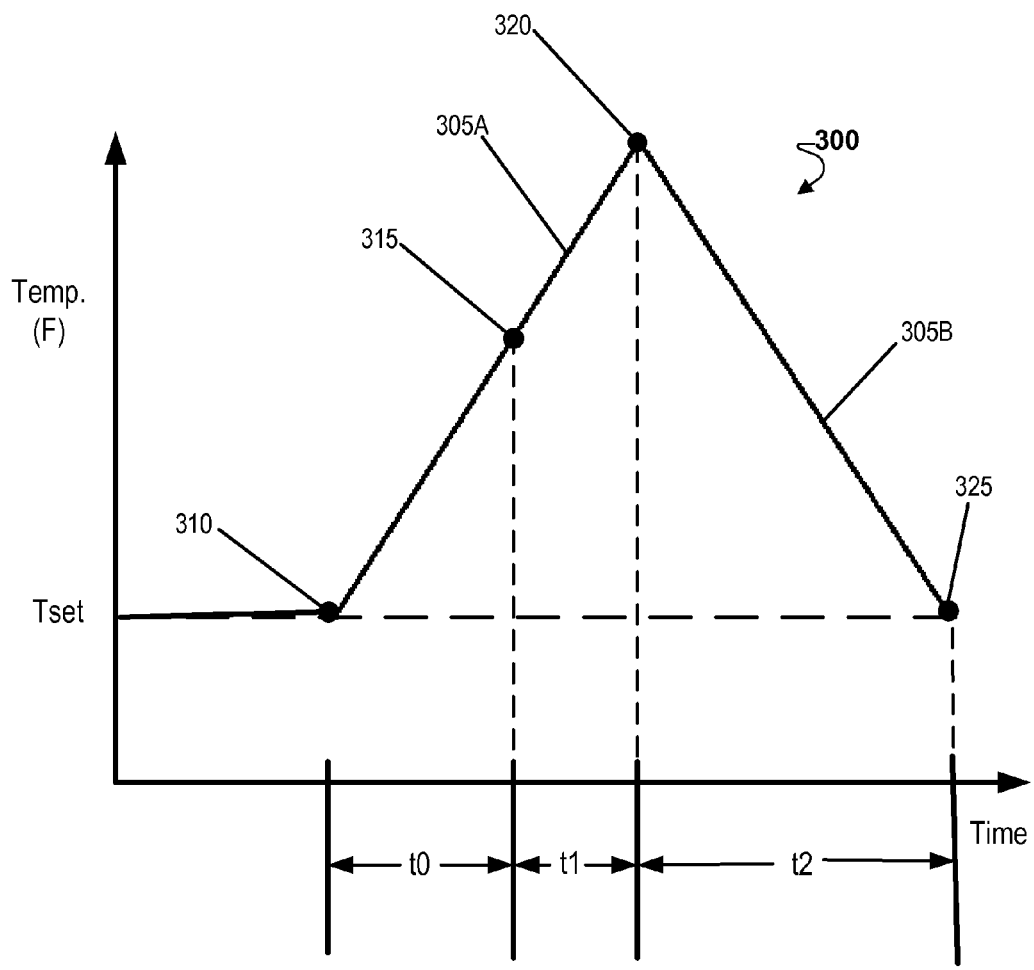
FIG. 3 is a graph that includes a plot of temperature of a climate controlled space versus time during a summer season or tropical climate scenario that is used to calculate a heating/cooling ratio for the climate controlled space of FIG. 1A.

FIG. 3 is a graph 300 that includes a plot of temperature of a climate controlled space 27 versus time in a summer season or tropical climate scenario that is used to calculate a heating/cooling ("H/C") ratio for the climate controlled space 27. Details of the graph 300 will be described below in connection with this figure as well as in connection with FIG. 5 also described below.

If the set point for the thermostat 20 is assumed to be constant for the duration of a control event (i.e.—an air conditioning control event), then the ratio of the heating slope for temperature curve segment 305A to the cooling slope of temperature curve segment 305B for climate controlled space 27 is a measure of the duration available for the energy deficit 205 (of FIG. 2). If the slopes for the heating segment 305A and the cooling segment 305B of graph 300 are equal, then for every minute of control cycling off there is generally one minute of energy deficit that may be used selectively as an energy "sink" for an electrical distribution system.

If the cooling curve slope for the second segment 305B is half as steep as the heating curve slope for the first segment 305A, then every minute of cycling control may yield at least two minutes of availability for the climate controlled space 27 to behave as an energy "sink" for electrical energy. Usually, the second segment 305B comprising the cooling curve is less steep compared to the first segment 305A of graph 300.

This calibration technique will work with a thermostat 20 but there is an alternate approach that may determine the ratio of the heating slope to the cooling slope, either at the thermostat 20 or at a load control switch 18 mounted at the space conditioning load 24, such as at a compressor of an air conditioner. The load control switch 18 may determine the H/C ratio without any temperature data received from the thermostat 20 as will be described below.

The calibration technique requires that the switch 18 sense a request for cooling from the thermostat 20, even if the request from the thermostat 20 is overridden by a control event at the switch 18. The steps for determining the ratio of the heating slope to the cooling slope include the following:

The switch 18 usually must have the capability of sensing the state of the Y-line, whether the physical switch within the DCU is opened or closed. An assumption is generally made that the thermostat 20 maintains the set point temperature in a relatively tight band. Any error in holding the set point temperature may lead to an inaccuracy in the calculation of the ratio of the heating slope to the cooling slope for the climate controlled space 27.

This testing of the switch 18 should usually be run during a summer season or in a tropical climate when the space conditioning load 24, such as an air-conditioning unit, is likely to run. At the beginning of the test, the switch 18 is cycled in order to turn off a compressor of an air-conditioning unit acting as the space conditioning load 24. The compressor is then allowed to remain off for some period of time. For example, the compressor may be allowed to remain in an off state for a duration that comprises one half hour.

After this one half hour period, control with the switch 18 is released to the thermostat 20 and this allows the space conditioning load 24, such as the compressor, to run, thus reducing the temperature in the climate controlled space 27. The elapsed time when the Y-line indicates that the climate controlled space 27 has returned to the set point temperature by turning off the compressor is recorded.

The ratio of the elapsed time while the space conditioning load 24 was allowed to run and cool the space 27 to the initial heating elapsed time when the space conditioning load 24 was held in an off state comprises the heating/cooling ratio ("H/C" ratio). The H/C ratio will allow the system 101, such as the central controller 100A, to calculate the energy deficit 205 as illustrated in graph 200 of FIG. 2. The energy deficit 205 of the climate controlled space 27 may comprise a "sink" in which excess or surplus energy produced by the regular and or surplus energy sources 77 is expended.

With this H/C ratio, the effective time that the central controller 100A of the utility provider may rely on the energy deficit 205 present within the climate controlled space 27 as an energy "sink" may be tracked. So if the time that the space conditioning load 24 (that may comprise a compressor) is held off by a control of them, the central controller 100A may estimate the amount of time that the climate controlled space 27 may act as a "sinking" resource for the system 101.

For example, if the heating time is one hour and the cooling time for the climate controlled space 27 is 1.75 hours, then the central controller 100A may use the climate controlled space 27 as a sinking resource for 1.75 minutes for each minute that the space conditioning load 24 is being controlled by the system 101. To a close approximation, the energy deficit 205 of the climate controlled space 27 will usually accumulate for multiple off cycles during the course of an afternoon during an exemplary summer season or tropical climate scenario in which the ambient temperature outside or external to the climate controlled space 27 is generally higher and rises throughout daylight hours.

FIG. 4 is a flowchart illustrating a method 400 for using one or more climate controlled spaces as energy storage units. Routine or sub-method block 405 is the first routine block of method 400. Routine block 405 generally corresponds with the calibration submodule 405 illustrated in FIG. 1B as described above.

In routine block 405, a select number of climate controlled spaces 27 may be calibrated for control with the central load control module 102 of the controller 100A. The central load control module 102 may select one or a plurality of climate controlled spaces 27 for calibration under this routine 405. Routine block 405 generally corresponds with the methodology described above in connection with FIG. 3 and which will be described in further detail below in connection with FIG. 5.

During this calibration routine block 405, the central load control module 102 determines the heating/cooling ("H/C") ratio for each climate controlled space 27. One of ordinary skill the art recognizes that this calibration routine block 405 should be executed over a full 24-hour window in order to determine the amount of thermal energy available with each climate controlled space 27. It is recognized that the amount of thermal energy may vary throughout the day due to thermal characteristics of the climate controlled space as well as the space conditioning load 24. The H/C ratio can also be used to "equalize" the effects of cycling over a population of energy consumers controlled by a utility provider. Lower H/C ratios may be cycled more so that all consumers experience approximately the same temperature rise within their climate controlled spaces 27 during an exemplary summer season or tropical climate scenario.

For example, in a summer season or tropical climate scenario, for those hours of the day in which sunlight is present, the amount of thermal energy may be significantly higher and may increase rapidly compared to the amount of thermal energy that may be measured during evening hours in the absence of sunlight.

Therefore, for each major weather season experienced by a climate controlled space 27, the central load control module 102 should calculate the H/C ratio for several segments throughout a twenty-four hour period, such as a first segment for sunlight hours and a second segment for evening hours in the absence of sunlight. As understood by one of ordinary skill the art, the calibration routine 405 does not need to be executed continuously for a single 24-hour period. Instead, the load control module 102 of the central controller 100A may perform a daylight calibration for a few hours on a first day and an evening calibration for a few hours in an evening on a second day. Also, calibration may vary with outside/external temperature and the amount of solar energy generated by sunshine. Calibration runs can be made for representative days and one or more closest values may be selected for a particular event day and time.

After the calibration routine block 405, the method 400 proceeds to decision block 410. In decision block 410, the central load control module 102 may determine if the system 101, and particularly, the regular and/or surplus energy resources 77, are experiencing an energy surplus event. If the inquiry to decision block 410 is negative, then the "NO" branch is followed to decision block 420. If the inquiry to decision block 410 is positive, then the "YES" branch is followed to routine block 415.

In routine block 415, the central load control module 102 may use the climate controlled spaces 27 selected in calibration routine block 405 as energy "sinks" for expending or receiving excess or surplus energy being produced by the system 101, and particularly energy resources 77. This energy sink routine 415 is helpful for surplus energy resources 77 such as for solar power plants during the day when such plants may produce an abundance or excess amount of energy that exceeds energy production plans for the system 101. Similarly, this energy sink routine 415 may be helpful for wind power plants during evening hours when such plants typically produce excess energy or more energy than is planned for the system 101. Further details of routine block 415 will be described below in connection with FIG. 6.

Next, in decision block 420, the central load control module 102 determines if an energy deficit event is being experienced by the system 101. If the inquiry to decision block 420 is negative, then the "NO" branch is followed back to decision block 410. If the inquiry to decision block 420 is positive, then the "YES" branch is followed to routine block 425.

In routine block 425, a sub-method for using the climate controlled spaces 27 selected in calibration routine block 405 as energy "sources" during load shed events is initiated. In this routine block 425, the central load control module 102 may start a direct load control event as described above in which the switch 18 of the customer premise control system 10 is cycled off in order to turn off the space conditioning load 24, such as an air conditioner during an exemplary summer season or tropical climate described above. Further details of this load should routine block 425 will be described below in connection with FIG. 7. The method 400 then returns back to decision block 410.

Figure 5:
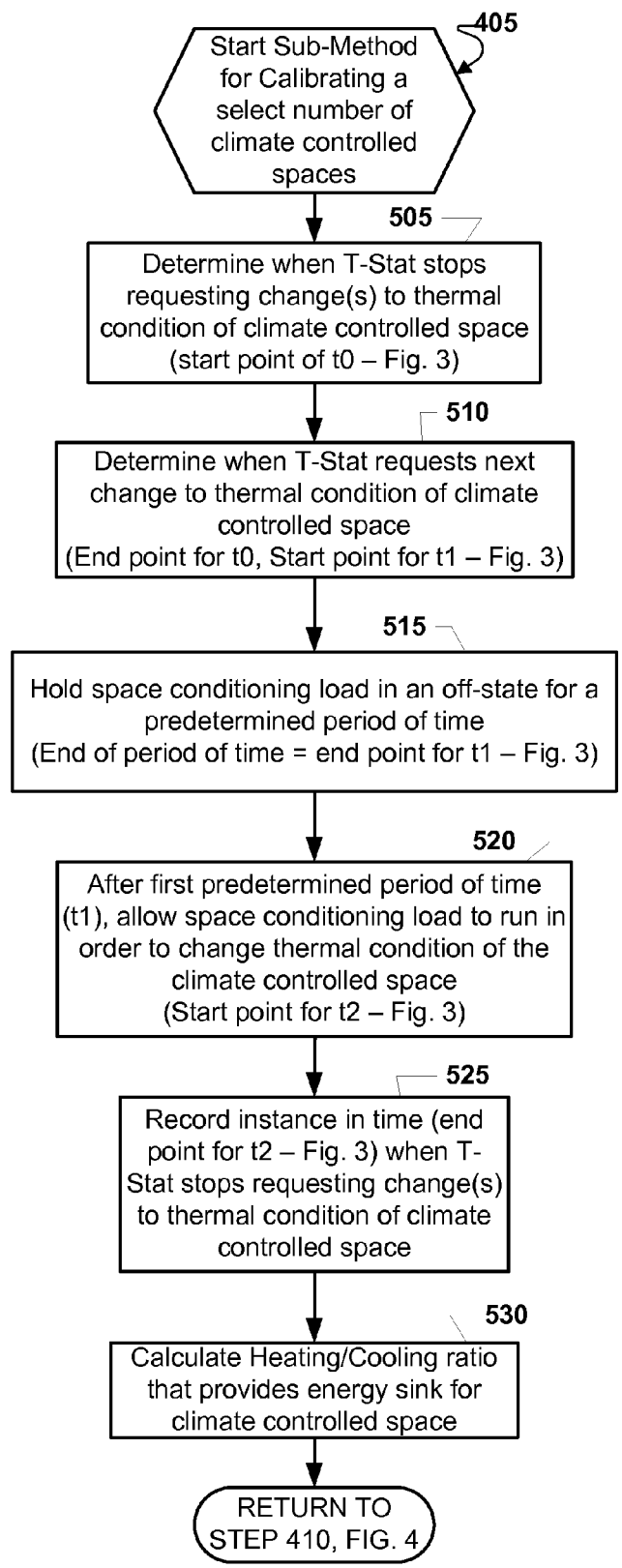
FIG. 5 is a flowchart illustrating a sub-method or routine of FIG. 4 for calibrating a select number of climate controlled spaces.

FIG. 5 is a flowchart illustrating a sub-method or routine 405 of FIG. 4 for calibrating a select number climate controlled spaces 27 for control with the central load control module 102 and/or local control module 14. As noted previously, the number of climate controlled spaces 27 may comprise one or a plurality of spaces 27.

References will be made to FIG. 5 as well as FIG. 3 mentioned above. At block 505 is the first step of the calibration routine 405. In block 505, the central load control module 102 or a local load control module 14 of the customer premise control system 10 may determine when the thermostat 20 stops requesting changes to the thermal condition of the climate controlled space 27. Block 505 generally corresponds to the start point 310 on temperature curve 305 of the time period t0 along the X-Axis as illustrated in FIG. 3.

Next, in block 510, the central load control module 102 or the local load control module 14 may determine when the thermostat 20 requests the next change to the thermal condition of the climate controlled space 27. In a summer season or tropical climate scenario, this block 510 will generally correspond when the thermostat 20 issues a command to the space conditioning load 24 to start a cooling operation for the climate controlled space 27. Block 510 generally corresponds to point 315 on the temperature curve 305 of FIG. 3. Point 315 on the temperature curve 305 also corresponds to the endpoint for the time period t0 as illustrated along the X-axis of FIG. 3.

Subsequently, in block 515, the central load control module 102 or the local load control module 14 may ignore the request issued by the thermostat 20 in block 510 and hold the space conditioning load 24 in an off-state for a predetermined period of time. This block 515 generally corresponds to point 315 of FIG. 3 which is also the start point for the time period t1 as illustrated along the X-axis of FIG. 3. While a predetermined period of time may be used to manage this off-state, a temperature threshold may also be used in combination with the time period if the temperature threshold is reached prior to the expiration of the selected predetermined period of time. This temperature threshold would only be applicable in those exemplary embodiments in which communication and/or control exists with the thermostat 20.

In an example in which communication and/or control exists with a thermostat 20, suppose the selected predetermined period of time comprises a magnitude of one hour. Meanwhile, the resident of the climate controlled space 27 has indicated that he or she is willing to tolerate a four degree shift in temperature above the set point temperature of the thermostat 20 before he or she would like the space conditioning load 24 to be activated. This means that if the resident of the climate controlled space 27 selected a set point temperature of 72° F., then the maximum allowed temperature for the off-state during calibration would be 76° F.

So if the temperature of the climate controlled space 27 reached 76° F. prior to the expiration of the one hour selected time period for the calibration, then the local load control module 14 or the central load control module 102 may allow the switch 18 to activate the space conditioning load 24. The local load control module 14 or the central load control module 102 would then record the period of time that was less than the selected one-hour duration. However, in those exemplary embodiments in which no communication and/or control exists with the thermostats 20, tolerance limits will be approximated by the utility provider and no direct control with respect to tolerance limits will exist for the consumer.

Next, in block 520, assuming that the temperature threshold selected by the resident of the climate controlled space 27 was not reached in those exemplary embodiments in which communication and/or control exists with a thermostat 20, then after the predetermined period of time selected in block 515, the central load control module 102 or the local load control module 14 would allow the space conditioning load 24 to run in order to change the thermal condition of the climate controlled space 27. This block 520 generally corresponds with point 320 on the temperature curve 305 of FIG. 3. Point 320 also corresponds with the end of the time period t1 and with the start of the time period t2 as illustrated along the X-axis of FIG. 3. Block 520 also generally corresponds with the condition described in connection with block 515 when the temperature threshold selected by the resident of the climate controlled space 27 has been reached.

Next, in block 525, the instant in time when the thermostat 20 stops requesting changes to the thermal condition of the climate controlled space 27 is recorded by the local load control module 14. This block 525 generally corresponds with the endpoint 325 of temperature curve 305 for time period t2 along the X-axis as illustrated in FIG. 3.

Subsequently, in block 530, the local load control module 14 and/or the central load control module 102 may calculate the heating/cooling ("H/C") ratio for the climate controlled space 27. This calculation will allow the local load control module 14 and/or the central load control module 102 to utilize the climate controlled space 27 as an energy "sink." The H/C ratio may be governed by the following equation:

$$H/C \text{ ratio} = (t0+t1)/t2 \qquad \text{EQ1:}$$

wherein t0 is a time period between when a set point temperature is reached (point 310 of temperature curve 305 of FIG. 3) and when a thermostat issues a request to a space conditioning load (point 315 of temperature curve 305), t1 is a time period between when the thermostat issues a request to the space conditioning load (point 315 of temperature curve 305) and when the space conditioning load is allowed to be activated (point 320 of temperature curve 305), and t2 is the time period between when the space conditioning load is allowed to be activated (point 320 of temperature curve 305) and when the space conditioning load is stopped once it reaches a set point temperature of the thermostat (point 325 of temperature curve 305).

As noted above, for each major weather season experienced by a climate controlled space 27, the central load control module 102 or local control module 14 should calculate the H/C ratio for several segments throughout a twenty-four hour period, such as a first segment for sunlight hours and a second segment for evening hours in the absence of sunlight. As understood by one of ordinary skill the art, the calibration routine 405 does not need to be executed continuously for a single 24-hour period. Instead, the load control module 102 of the central controller 100A may perform a daylight calibration for a few hours on a first day and an evening calibration for a few hours in an evening on a second day. The H/C ratio may be calculated using the thermostat 20 or by using the switch 18 alone.

As noted previously, in some exemplary embodiments, the central load control module 102 or the local control module 14, which are usually installed external to the space 27 by the utility provider, may not have access to temperature data produced by the thermostat 20. To calculate the H/C ratio without the thermostat 20, the switch 18 may monitor when the thermostat has shut-off a space conditioning load 24, like an air-conditioner such as indicated by point 310 on graph 300 of FIG. 3. Next, the switch 18 and/or the load control module 14 may monitor when the thermostat 20 issues a command, at point 315 of graph 300, to turn "on" the space conditioning load 24. The switch 18 or load control module 14 may ignore this command from the thermostat 20 for a period of time (t1 of graph 300) until point 320 of graph 300. At point 320, the switch 18 or module 14 may allow the command from the thermostat 20 to turn-on the space conditioning load 24. The switch 18 or module 14 may then monitor the time (time period t2 of graph 300) when the thermostat 20 issues the command to turn-off the space conditioning load 24 when the thermostat set point temperature has been reached. From these three time periods, the switch 18 or module 14 may calculate the H/C ratio without having access to the temperature data and/or control of the thermostat 20.

For a large population of climate control spaces 27, a sample of the population may be used to compute an average H/C ratio which would then be used to approximate the performance of the population. The H/C ratio may be used in conjunction with the switches 18 to equalize the temperature rise within a plurality of climate controlled spaces 27 forming a statistical population.

Also, the H/C ratios for different day segments and for different times/seasons of the year may be stored locally within memory 16 of the customer premise equipment 10. And an index may be sent from the central load control module 102 over the communications network 30 that instructs the load control module 14 or switch 18 to pull a particular H/C ratio from the local memory 16. Alternatively, all of the H/C ratios may be stored centrally within the controller 100A of the utility provider which are accessible by the central load control module 102. The local load control module 14 or switch 18 may calculate each H/C ratio and then send it over the communications network 30 to the central load control module 102. The central load control module 102 may then modify each H/C ratio and return the ratio to memory 16 of the customer premise equipment 10.

Figure 6:
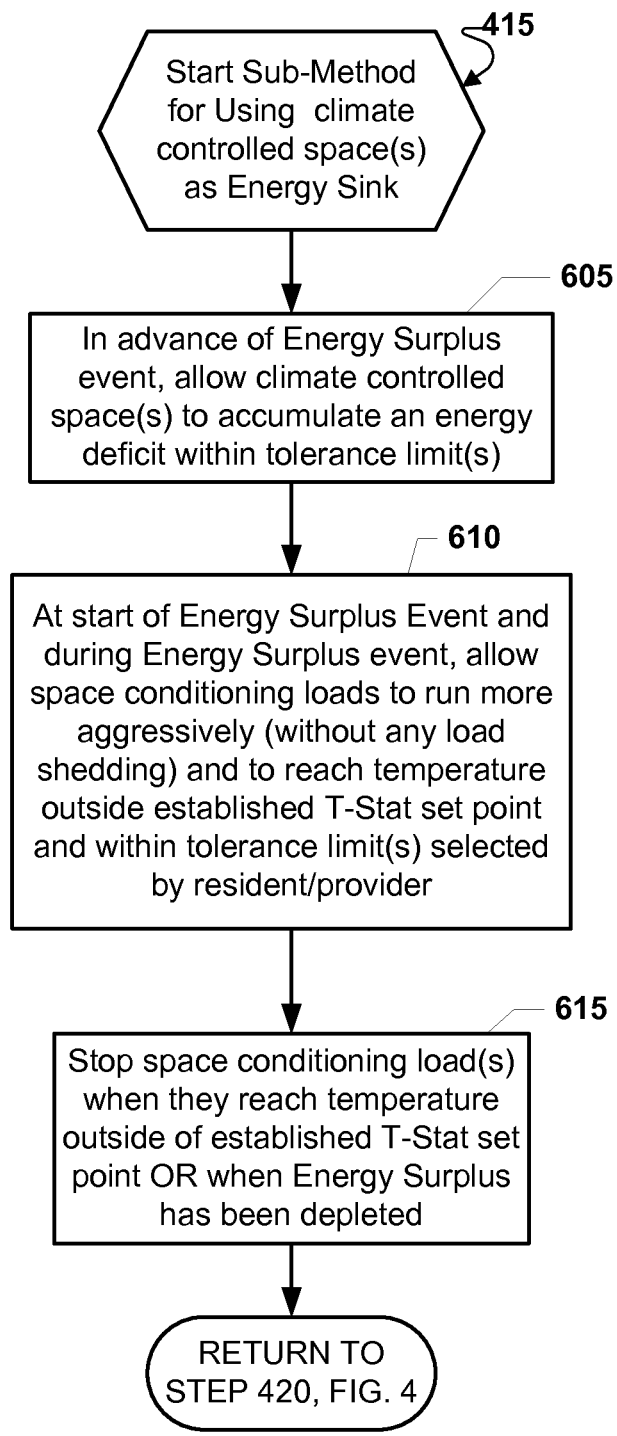
FIG. 6 is a flowchart illustrating a sub-method or routine for using one or more climate controlled spaces as energy sinks.

FIG. 6 is a flowchart illustrating a sub-method or routine 415 for using one or more customer buildings as energy sinks. This routine 415 corresponds with routine 415 as illustrated in FIG. 4. Block 605 is the first step of routine 415.

In block 605, the central load control module 102 or the local load control module 14 allow an energy deficit, such as energy deficit 205 as illustrated in FIG. 2, to be accumulated within the one or more climate controlled spaces 27 and within tolerance limits that may comprise the temperature delta established by the resident or the utility provider. The central load control module 102 or the local load control module 14 will build up this energy deficit 205 in each climate controlled space 27 in accordance with the heating/cooling ratio calculated in calibration routine 405 described above.

This energy deficit 205 for each climate controlled space 27 may be unique due to the thermal characteristics of each space 27. For a large population of spaces 27, a sample of the population may be used to compute an average H/C ratio which would then be used to approximate the performance of the population. Block 605 also generally corresponds to point 315 of FIG. 3 in which the local control module 14 is instructed to ignore any space conditioning requests issued by the thermostat 20.

For example, the thermostat 20 may issue a request to turn-on the space conditioning load 24 comprising an air conditioner in order to cool the climate controlled space 27 because the set point temperature of the thermostat 20 has been exceeded. In block 605, the central load control module 102 has issued commands to the local load control modules 14 to override or have the requests issued by the thermostats 20 be ignored so that the space conditioning load 24 remains in an off-state in order to generate an energy deficit such as deficit 205 as illustrated in FIG. 2.

As noted above, while the local load control modules 14 may allow an energy deficit 205 to be accumulated within the climate controlled space 27, the load control modules 14 may not allow the energy deficit 205 to become a magnitude such that it exceeds the temperature delta or tolerance limit established by either the resident or the utility provider in those exemplary embodiments in which the utility provider has access to the thermostat 20.

As discussed in a previous example, a set point temperature may comprise 72° F. while the temperature delta above the set point may be established at 4° F. so that control of the space conditioning load 24 from the central load control module 102 or local control module 14 may be overridden (stopped) if the temperature measured by the thermostat measures or exceeds the temperature of 76° F. (a.k.a. the tolerance limit). However, in some exemplary embodiments, utility providers and corresponding central controllers 100A may not have access to thermostats 20. In these exemplary embodiments in which no communication and/or control exists with the thermostats 20, tolerance limits will be approximated by the utility provider and no direct control with respect to tolerance limits will exist for the consumer.

Next, in block 610, at the start of an energy surplus event and during an energy surplus event, the central load control module 102 and/or the local load control module 14 may allow the space conditioning loads 24 to run more aggressively (without any load shedding) and to reach a temperature outside of an established thermostat set point and within tolerance limits selected by the resident or utility provider. The temperature selected by the central load control module 102 and/or the local load control module 14 may be unique for each climate controlled space 27 and is made based on the heating/cooling ration calculated for the climate controlled space 27. One of ordinary skill in the art recognizes that each heating/cooling ratio may be unique for each climate controlled space 27 due to the unique thermal characteristics for each space 27.

This block 610 generally corresponds to point 320 and the cooling segment 305B of the graph 300 as illustrated in FIG. 3. While the endpoint 325 of graph 300 is shown to be equal to the set point temperature, this block 610 may allow the space conditioning load 24 to go beyond (in this cooling case, below) the set point temperature of the thermostat 20 up to a lower threshold that may be established by the resident and/or utility provider.

For example, a resident and/or utility provider may establish a temperature delta of 3° F. as the low point for a tolerance limit in which the space conditioning load 24 may reach during an energy surplus event. This means, that if the temperature set point for the thermostat 20 is 72° F., then the space conditioning load 24 may be allowed to cool the climate controlled space 27 to a low temperature of 69° F. As noted above, the resident and/or utility provider may establish a temperature delta of 4° F. as the high point for a tolerance limit when the climate controlled space 27 is allowed to "heat up" in order to create the energy deficit 205.

One of ordinary skill in the art recognizes that the temperature delta above and below the temperature set point of the thermostat 20 may be equal in magnitude or they may be set to be different in magnitude. These temperature deltas above and below the temperature set point of the thermostat 20 are generally referenced as the tolerance limits illustrated in the flow charts of this specification.

Referring back to FIG. 6, in block 615, the central load control module 102 and/or local load control module 14 may stop the space conditioning load(s) 24 when they have reached a temperature that is outside of the established thermostat set point (but not greater than the tolerance limits set by the resident or utility provider) or when the energy during the energy surplus event has been depleted/expended. The central load control module 102 may determine when the energy during the energy surplus event has been depleted/expended. The method 400 then returns to decision block 420 of FIG. 4.

Figure 7:
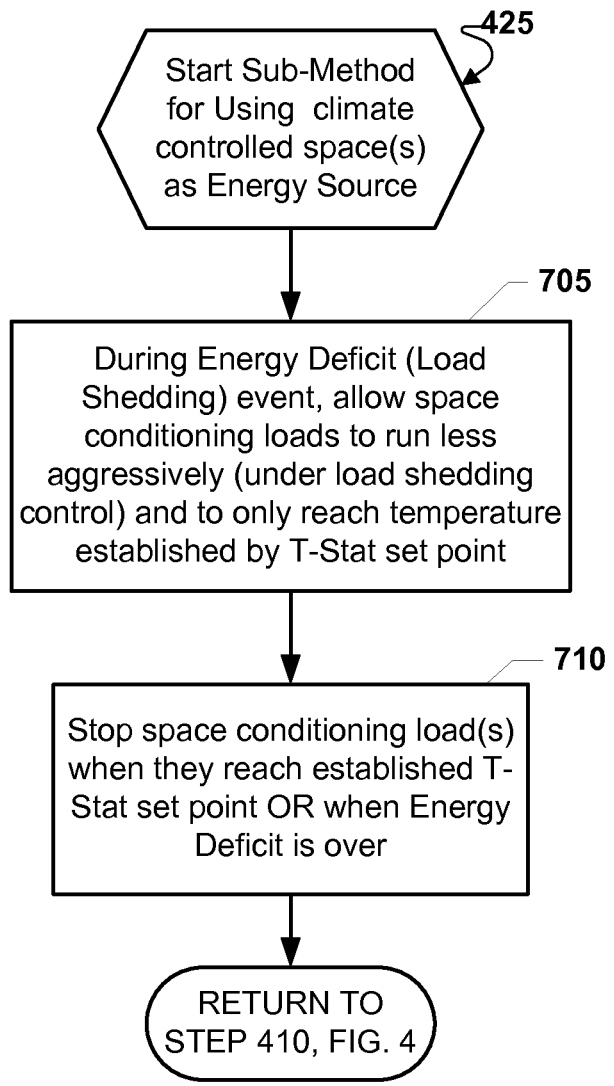
FIG. 7 is a flowchart illustrating a sub-method or routine for using one or more climate controlled spaces as energy sources.

FIG. 7 is a flowchart illustrating a sub-method or routine 425 for using one or more climate controlled spaces 27 as energy "sources" during high energy or peak demands. Routine 425 of FIG. 7 corresponds with routine 425 of FIG. 4.

Block 705 is the first step of routine 425. In block 705, during an energy deficit or load shedding event, the central load control module 102 and/or local load control module 14 allows space conditioning loads 24 to run less aggressively while under load shedding control and to only reach temperatures established by the thermostat temperature set point. Block 705 generally corresponds with a direct load control event as described above. During such an event, the climate controlled spaces 27 act as indirect "sources" of energy from a perspective that a reduced amount of energy is now needed or permitted to change the temperature of the climate controlled spaces 27 when the switches 18 are under direct load control from the local load control module 14 and/or central load control module 102.

Next, in block 710, the central load control module 102 and/or load control module 14 stop or cease any direct load control of the switches 18 when the energy deficit period is over. The method 400 then returns to decision block 410 of FIG. 4.

The word "exemplary" is used in this description to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Further, certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a tangible computer-readable medium. Computer-readable media include both tangible computer storage media and tangible communication media including any tangible medium that facilitates transfer of a computer program from one place to another. A tangible computer storage media may be any available tangible media that may be accessed by a computer. By way of example, and not limitation, such tangible computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

Also, any connection is properly termed a tangible computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, and DSL are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for managing an energy supply of a utility provider, comprising:
   calibrating one or more climate controlled spaces for a controller by calculating a heating or cooling ratio for the one or more climate controlled spaces;

determining if an energy supply surplus exists within a utility system;

if an energy supply surplus exists, then start using the one or more climate controlled spaces as energy sinks for expending energy according to the heating/cooling ratio;

determining if an energy supply deficit exists; and if an energy supply deficit exists, then start using the one or more climate controlled spaces as energy sources in which a direct load control algorithm is used to reduce consumption of energy, wherein the heating or cooling (H or C) ratio is governed by the following equation:

$$H \text{ or } C \text{ ratio} = (t0+t1)/t2$$

wherein t0 is a time period between when a set point temperature is reached and when a thermostat issues a request to a space conditioning load, t1 is a time period between when the thermostat issues a request to the space conditioning load and when the space conditioning load is allowed to be activated, and t2 is a time period between when the space conditioning load is allowed to be activated and when the space conditioning load is stopped once it reaches a set point temperature of the thermostat.

2. The method of claim 1, wherein the one or more climate controlled spaces comprises at least one of a room, a plurality of rooms, a single building, and a plurality of buildings.

3. The method of claim 1, further comprising holding a space conditioning load in an off-state for a predetermined period of time in order to calculate the heating or cooling ratio of the one or more climate controlled spaces.

4. The method of claim 3, wherein the space conditioning load comprises at least one of an air conditioner, a compressor, a heat pump, a fan, and a furnace.

5. The method of claim 1, further comprising sampling a population of climate controlled spaces to determine an average heating or cooling ratio and using that average heating or cooling ratio for the population.

6. The method of claim 1, further comprising determining the heating or cooling ratio using at least one of a thermostat and a switch.

7. The method of claim 1, further comprising storing the heating or cooling ratio locally at customer premise equipment.

8. The method of claim 1, further comprising receiving the heating or cooling ratio from across a communications network and modifying the heating or cooling ratio with a central controller.

9. The method of claim 1, further comprising storing the heating or cooling ratio locally in memory.

10. A system for managing energy of a utility provider, comprising:
means for calibrating one or more climate controlled spaces for a controller by calculating a heating or cooling ratio for the one or more climate controlled spaces;
means for determining if an energy surplus exists within a utility system;
means for using the one or more climate controlled spaces as energy sinks for expending energy according to the heating or cooling ratio if an energy surplus exists;
means for determining if an energy deficit exists; and
means for using the one or more climate controlled spaces as energy sources in which a direct load control algorithm is used to reduce consumption of energy if an energy deficit exists, wherein the heating or cooling (H or C) ratio is governed by the following equation:

$$H \text{ or } C \text{ ratio} = (t0+t1)/t2$$

wherein t0 is a time period between when a set point temperature is reached and when a thermostat issues a request to a space conditioning load, t1 is a time period between when the thermostat issues a request to the space conditioning load and when the space conditioning load is allowed to be activated, and t2 is a time period between when the space conditioning load is allowed to be activated and when the space conditioning load is stopped once it reaches a set point temperature of the thermostat.

11. The system of claim 10, wherein the one or more climate controlled spaces comprises at least one of a room, a plurality of rooms, a single building, and a plurality of buildings.

12. The system of claim 10, further comprising means for holding a space conditioning load in a off-state for a predetermined period of time in order to calculate the heating or cooling ratio of the one or more climate controlled spaces.

13. The system of claim 12, wherein the space conditioning load comprises at least one of an air conditioner, a compressor, a heat pump, a fan, and a furnace.

14. The system of claim 10, further comprising allowing an energy deficit to build up in the one or more climate controlled spaces in accordance with the heating or cooling ratio.

15. A system for managing an energy supply for a utility provider comprising:
a central controller comprising a central load control module, the central load control module operable for:
calibrating one or more climate controlled spaces by calculating a heating or cooling ratio for the one or more climate controlled spaces;
determining if an energy supply surplus exists within the system;
if an energy supply surplus exists, then start using the one or more climate controlled spaces as energy sinks for expending energy according to the heating or cooling ratio;
a communications network coupled to the central controller;
customer premise equipment coupled to the communications network; and
a space conditioning load coupled to the customer premise equipment and to the one or more climate controlled spaces, wherein the heating or cooling (H or C) ratio is governed by the following equation:

$$H \text{ or } C \text{ ratio} = (t0+t1)/t2$$

wherein t0 is a time period between when a set point temperature is reached and when a thermostat issues a request to a space conditioning load, t1 is a time period between when the thermostat issues a request to the space conditioning load and when the space conditioning load is allowed to be activated, and t2 is a time period between when the space conditioning load is allowed to be activated and when the space conditioning load is stopped once it reaches a set point temperature of the thermostat.

16. The system of claim 15, wherein the space conditioning load comprises at least one of an air conditioner, a compressor, a heat pump, a fan, and a furnace.

17. The system of claim 15, wherein the energy supply comprises electrical energy.

18. The system of claim 15, further comprising memory within the customer premise equipment for storing the heating or cooling ratio locally.

19. The system of claim 15, wherein the central load control module receives the heating or cooling ratio from across the communications network, the central load control module modifying the heating or cooling ratio.

20. The system of claim 19, further comprising memory within the customer premise equipment for storing the heating or cooling ratio locally.

* * * * *